United States Patent [19]

Despic et al.

[11] 4,098,606

[45] Jul. 4, 1978

[54] ELECTROCHEMICALLY ACTIVE ALUMINIUM ALLOY, THE METHOD OF ITS PREPARATION AND USE

[75] Inventors: Aleksandar R. Despic; Dragutin M. Drazic; Purenovic M. Milovan, all of Belgrade, Yugoslavia

[73] Assignee: Institut Tehnickih Nauka Sanu, Belgrade, Yugoslavia

[21] Appl. No.: 636,358

[22] Filed: Dec. 1, 1975

[30] Foreign Application Priority Data

Feb. 20, 1975 [YU] Yugoslavia .............................. 405/75

[51] Int. Cl.$^2$ ............................................. C22C 21/00
[52] U.S. Cl. ......................................... 75/138; 148/3;
148/13; 148/32; 204/148; 204/197; 204/293;
429/218

[58] Field of Search .................. 75/138; 148/32, 32.5, 148/3, 13; 204/148, 197, 293; 429/218

[56] References Cited

U.S. PATENT DOCUMENTS

| | | | |
|---|---|---|---|
| 3,281,239 | 10/1966 | Reding et al. | ......................... 75/138 |
| 3,379,636 | 4/1968 | Reding et al. | ......................... 75/138 |

*Primary Examiner*—H. Dean
*Attorney, Agent, or Firm*—Bidyut K. Niyogi

[57] ABSTRACT

An electrochemically active alloy of aluminum with indium, gallium and thallium, in which the alloy would consist of, by weight percentage, about 0.01% to 0.5% of indium, gallium, or thallium of varying and selective composition, while the ratios between indium, gallium and thallium are arbitrary. The method would incorporate heating a selected composition in an inert atmosphere to melting and subsequent cooling.

3 Claims, No Drawings

ELECTROCHEMICALLY ACTIVE ALUMINIUM ALLOY, THE METHOD OF ITS PREPARATION AND USE

BACKGROUND OF THE INVENTION

1. Field of the Invention

This invention relates to an electrochemically active alloy of aluminum in which the alloy has selected inclusions of elements, which improve the alloy for utilizing it in special circumstances, such as corrosion protection and primary elements.

2. Description of the Prior Art

It is generally known that electrodes, preferably for use as primary elements, are essentially made from zinc. However, due to the high price of zinc, they are not cheap enough. Hence, there is a tendency to try and discover a material which would have the same properties as zinc, or even better, but which would be cheaper.

It has been considered and tried to put into use aluminum dipped in the electrolytic solution that represents in principle a useful system for practical application as an electrode for the primary elements or for protection against corrosion. It has a high negative theoretical equilibrium potential and high ampere/hour capacity since each atom exchanges 3 electrons in the process of ionization. In practice, however, aluminum cannot be used as a pure metal since, due to the formation of a protective oxide layer, the open-circuit potential spontaneously establishes at a far more positive value than the theoretical one. If the potential is made more positive than the open-circuit potential in order to dissolve aluminum anodically, passivization of its surface very soon occurs and the process of dissolving either slows down considerably or stops. Besides, contrary to expectations, hydrogen evolution reaction with the corresponding self-corrosion of aluminum is enhanced at more positive potentials (the so-called "negative differential effect").

SUMMARY OF THE INVENTION

An object of the invention is to provide an alloy of a material based on aluminum which would remain active for anodic dissolution up to high anodic current densities and under a wider span of potentials and at the same time become more corrosion resistant with as small a value as possible of the negative differntial effect.

According to the present invention, a material was obtained by alloying aluminum with small amounts of indium, or gallium, or thallium. Indium, gallium or thallium were added to aluminum in the amounts of, by weight percentage, at least 0.01 parts per 100 parts of aluminum (W/W). When gallium was added in amounts larger than 0.5 parts per 100 parts of aluminum, this made the alloy worse than pure aluminum as far as corrosion was concerned. These elements were added to aluminum separately, or in combinations of any two of them or all three together. The ratio between indium, gallium and thallium in these combinations is arbitrary. It was shown experimentally that such a material satisfied the above requirements, in that a. such alloys establish a relatively negative open-circuit potential in an alkali chloride solution;

b. the corrosion rate of these alloys, when immersed in the solution, is relatively low;

c. at more positive potentials than the open-circuit one, the alloys dissolve anodically up to relatively very high current densities without passivization and with low anodic overpotentials (small losses of voltage); and d. the self-corrosion current (i.e., hydrogen evolution) increases only slightly, so that, at current densities higher than 100 mA/cm$^2$, the use of aluminum for the anodic current is practically 100%. It was rather surprising to find that such a material has such qualities and hence can be used successfully as a substitute for the materials used so far (e.g., zinc) where good electrochemical activity was needed, such as in the negative electrodes of the primary batteries or batteries with changeable plates. It appeared, also, that the said alloys can be successfully used as protectors against the corrosion of different structures (e.g., ships, cars, etc.). This material is many times cheaper than the materials used so far.

BRIEF DESCRIPTION OF THE INVENTION

The invention will now be described, by way of example only, with reference to the accompanying examples:

EXAMPLE 1

The aluminum-indium alloy was prepared so that for each 100 parts (by weight) of aluminum, 0.2 parts of indium was added. The mixture was heated in an inert atmosphere until both metals melted. The mixture was homogenized and cooled. The solid mixture obtained can be used as an electrode. Such an electrode was tested in solution of NaCl. The measured open-circuit potential was $-1,250$ V when measured in relation to the saturated calomel electrode (SCE). The measured corrosion rate at this potential was found to be negligible.

The anodic polarization curve for this alloy was determined and it was found that anodic current densities up to 100 mA/cm$^2$ are obtained with low overpotentials (smaller than 100 mV) and that the passivization current density is larger than 1 A/cm$^2$. The increase of the anodic current density increases the self-corrosion current (negative differential effective) but to a smaller extent than for the pure aluminum; the speed amounted to only 3% for the unheated alloy, but 0.5% for the heated alloy, compared to the 16% of the anodic dissolution current density for the pure aluminum.

EXAMPLE 2

The alloy used in Example 1 was used for the protection against corrosion of a piece of steel dipped in a sodium chloride solution. It was found that with a current of only 0.38 mA between the protector made of this alloy and steel, the piece of steel obtained the negative potential of $-0.6$ V, sufficient for good corrosion protection, while with zinc as the protector for the same piece of steel, a current of 0.55 mA was necessary to achieve the same protection. In the latter case, more material should be used for the same protective action.

EXAMPLE 3

The aluminum alloy with a small amount of gallium was obtained as the alloy in Example 1, except that in 100 parts of aluminum 0.1 part of gallium was added. The solid mixture obtained was used as an electrode and tested in NaCl solution. The open-circuit potential was $-1,400$ V as compared to SCE, while the polarization and the negative differential effect were as small as in Example 1 up to the anodic current density of 0.5 A/cm$^2$.

This alloy was used as a protector against corrosion of a piece of steel dipped in NaCl solution. Similar results were obtained as in Example 2.

EXAMPLE 4

An aluminum alloy with low percentage of thallium was obtained as in Example 1. The alloy consists of 100 parts of aluminum and 0.05 parts of thallium. The alloy obtained was tested in the same manner as the alloys in Examples 1 and 2, and the results were similar to thos given in Example 3. In the present invention, the Aluminum-Thallium alloy differs distinctively from what was previously known, in that previously little or no care had been taken to prepare a straight Al-Tl alloy and as to homogenization and as to the method of cooling. Whereas in the present Al-Tl alloy, the composition has been homogenized where the homogenization provides a mixing and this melt is then submitted to cooling by quenching of the melt.

EXAMPLE 5

Aluminum alloys with indium, gallium, or thallium, or any combination of those metals were prepared so that 100 parts of aluminum were mixed with 0.01 – 0.5 weight parts of the said metals or their combination, and were used to make cans of the Leclanche dry cell and the cell was prepared in the manner used in industry. The properties of such cells were compared with the same type of conventional commercial cells with the can made of zinc. The results obtained were somewhat better when the can was made of any of the aluminum alloys.

EXAMPLE 6

The alloys from the previous Examples, prepared as described in Example 1 after homogenization and cooling were heated again to 300° – 400° C and kept at this temperature for 1–4 hours, and then slowly cooled. The alloys treated in this way showed even better properties; somewhat more negative open-circuit potential and considerably smaller negative differential effect. For example, the alloy with 0.055% of indium after annealing had for 200 mV more negative open-circuit potential, while the negative differential effect decreased from 7.8% to 0.5%.

From the above examples, it is clearly seen that aluminum provides an electrochemically active alloy with selective inclusions of indium, gallium and thallium, in which the weight percentage of the including element is carefully regulated, the ratios between the inclusion not only being arbitrary, but also selective and of controlled varying composition.

We claim:

1. The electrochemically active alloy of aluminum in which the alloy consists of, by weight percentage, from 0.01% to 0.5% of gallium, from 0.01% to 0.5% of indium and 0.01% to 0.5% of thallium, with the balance being aluminum with incidental impurities.

2. A method of obtaining an electrochemically active alloy of aluminum as claimed in claim 1, the steps comprising heating a composition in an inert atmosphere to melting, homogenizing the melt by mixing and cooling, the composition consisting of, by weight percentage, 0.01% to 0.5% of indium, 0.01% to 0.5% of gallium, and 0.01% to 0.5% of thallium, with the balance being aluminum with incidental impurities.

3. A method of obtaining an electrochemically active alloy of aluminum as claimed in claim 2, in which the cooled alloy is reheated to between 300° C to 400° C for about one hour to four hours and subsequently slowly cooled at ambient temperatures.

* * * * *